(12) United States Patent
Thual et al.

(10) Patent No.: US 6,768,837 B1
(45) Date of Patent: Jul. 27, 2004

(54) METHOD FOR COLLECTIVE PRODUCTION OF MICROLENSES AT THE TIP OF AN OPTICAL FIBER ASSEMBLY SUCH AS A FIBER TAPE

(75) Inventors: Monique Thual, Trebeurden (FR); Philippe Chanclou, Louannec (FR); Jean Lostec, Prat (FR)

(73) Assignee: France Telecom SA, Paris (FR)

( * ) Notice: Subject to any disclaimer, the term of this patent is extended or adjusted under 35 U.S.C. 154(b) by 139 days.

(21) Appl. No.: 10/009,199

(22) PCT Filed: Jun. 8, 2000

(86) PCT No.: PCT/FR00/01593
§ 371 (c)(1),
(2), (4) Date: Apr. 5, 2002

(87) PCT Pub. No.: WO00/75700
PCT Pub. Date: Dec. 14, 2000

(30) Foreign Application Priority Data

Jun. 9, 1999  (FR) .............................................. 99 07289

(51) Int. Cl.⁷ ............................. G02B 6/26; G02B 6/04; G02B 6/32
(52) U.S. Cl. ............................. 385/33; 385/15; 385/115
(58) Field of Search ............................. 385/15, 31, 33, 385/115

(56) References Cited

U.S. PATENT DOCUMENTS

| 4,804,395 A | | 2/1989 | Clark et al. .......................... 65/2 |
| 5,563,969 A | * | 10/1996 | Honmou ........................ 385/35 |
| 5,595,669 A | | 1/1997 | Le Bris ................... 219/121.59 |
| 5,598,493 A | * | 1/1997 | Bonham et al. ............... 385/33 |
| 5,930,430 A | * | 7/1999 | Pan et al. ....................... 385/94 |

FOREIGN PATENT DOCUMENTS

EP  0 825 464 A1  2/1998

OTHER PUBLICATIONS

Shiraishi et al.; *A Fiber Lens with a Long Working Distance for Integrated Coupling Between Laser Diodes and Single-Mode Fibers* Journal of Lightwave Technology, US, IEEE, vol. 13, No. 8, Aug. 1995.

* cited by examiner

*Primary Examiner*—John D. Lee
*Assistant Examiner*—Tina M Lin
(74) *Attorney, Agent, or Firm*—Patterson, Thuente, Skaar & Christensen, P.A.

(57) ABSTRACT

A method for the collective production of microlenses at the end of a set of aligned optical fibers. The method consists in heating the end of all the fibers by means of an electric arc in order to form the microlenses, the plane in which the ends of the fibers are situated being distant from the line of the hottest points in the electric arc in order to round their end homogeneously. Useful for making optical and optoelectric modules.

4 Claims, 2 Drawing Sheets

METHOD FOR COLLECTIVE PRODUCTION OF MICROLENSES AT THE TIP OF AN OPTICAL FIBER ASSEMBLY SUCH AS A FIBER TAPE

BACKGROUND OF THE INVENTION

1. Field of the Invention

The invention relates to a method for the collective production of microlenses at the end of a set of optical fibres, of the ribbon of fibres type.

The present invention applies to optical and optoelectronic modules amongst other things for optical telecommunications. It applies more particularly to the production of microlenses on optical fibres in order to improve the coupling between optical and optoelectronic components. These microlenses are particularly well adapted to collective coupling with active components in arrays, such as lasers, semiconductor amplifiers, VCSELs or photodetectors for example.

2. Discussion of the Related Art

In the literature a large number of articles are found having methods for the individual manufacture of microlenses at the end of fibres which improve the coupling between active components and monomode fibres. The history of these microlenses is presented in the collection of publications "Microlenses Coupling Light to Optical Fibers", Huey-Daw Wu, Frank S. Barnes, 1991, pp. 149–213: "Microlenses Coupling Light to Optical Fibers" IEEE Lasers and Electro-optics Society 1991 [1].

On the other hand, very few articles are found concerning collective coupling lenses.

The most recent articles report on combinations of lengths of fibres of different natures and the fashioning of a lens at the end of fibres, but always in order to produce individual microlenses.

In fact, individual coupling lenses are known. Reference can be made to the article by K. Shiraishi et al. (University of Utsunomiya, Japan) "A fiber with a long working distance for integrated coupling between laser diodes and single-mode fibers", Journal of Lightwave Technology, Vol. 13 No 8, pp. 1736–1744, August 1995 [2], which presents a lens whose working distance is 160 $\mu$m for laser-fibre coupling losses of 4.2 dB and lateral and angular axial positioning tolerances respectively of 35 $\mu$m, 2.6 $\mu$m and 0.8° for an additional loss of 1 dB. The results were obtained for a laser emitting at a wavelength of 1.49 $\mu$m with a mean total half-height divergence of 20.5° (that, is to say 34° at $1/e^2$). This is a length of fibre 1 without a core and with a hemispherical end, welded to a monomode fibre 1 whose core has been locally enlarged by heat treatment, as shown by FIG. 1.

In a more recent article, Shiraishi and Hiraguri "A lensed fiber with cascaded Gi-fiber configuration for efficient coupling between LDs to single-mode fibers" ECOC '98, 20–24 September, Madrid Spain, pp. 355–356 [5], propose a new lens consisting of two lengths of monomode fibres, of different natures, whose focusing parameters are different, welded together and to a monomode fibre by electric arc. A hemispherical profile is conferred on the end multimode fibre by means of an electric arc welder. Losses of 2 dB are obtained in front of a laser diode emitting at 1.3 $\mu$m, whose total divergence in far field at half-height of the maximum is 24.90×19.50 (that is to say 42.2°×33.1° at $1/e^2$). The working distance is 50 $\mu$m.

If the publications concerning individual fibre laser coupling lenses are numerous, those dealing with collective lenses intended for multichannel optical modules are more rare.

A method is known which consists in interposing an array of microlenses (not fixed to the fibre ribbons). By way of example, the coupling lens shown in FIG. 2 of G. Nakagawa and al. (Fujitsu Laboratories, Japan) "Highly efficient coupling between LD array and optical fiber array using Si microlens array" IEEE Photonics Technology Letters, Vol. 5, No 9, pp. 1056–1058, September 1993 [4], makes it possible to obtain 4.8±0.3 dB by dynamic coupling between the array 4 of four lasers with a total half-height divergence of 30° (that is to say 44° at $1/e^2$) and 4 monomode fibres $2_1$, $2n$ by means of a matrix of silicon lenses. This type of coupling complicates the assembly steps, since it adds an additional component to be positioned very precisely.

In 1996, J. Le Bris "High performance semiconductor array module using tilted ribbon lensed fibre and dynamical alignment" ECOC '96 Oslo THc.2.3, p. 4.93, from the company Alcatel (AAR, France) proposes a lensing method on a fibre ribbon which consists of chemically etching a ribbon of monomode fibres and reworking the end of each fibre of the ribbon by electric arc. With this method 3.6 dB of loss is obtained in front of an array of semiconductor amplifiers with ribbons misaligned by 20×25° of total half-height divergence (that is to say 34×42.5° at $1/e^2$). The wavelength is 1.55 $\mu$m.

The recommended solutions for the "lensing" of the fibres (the fitting of lenses at the end of fibres) which make it possible to obtain good coupling levels are not collective methods in the case of references [1] to [3].

In addition, the outside diameter of the 125 $\mu$m fibre is not maintained all along the microlens, which poses a problem for the hybridisation on a silicon platform in precise positioning Vs and for precision ferrule fitting.

For the collective methods known at the present time, the coupling losses are still too high. In addition, the use of discrete lenses described in reference [4] requires several successive alignments, which increases the number of assembly steps compared with microlenses attached at the end of the fibre. The method described in reference [5] also imposes a very short working distance of less than 15 $\mu$m in addition to the fact that it is complex.

SUMMARY OF THE INVENTION

The purpose of the present invention is to improve the coupling between an array of active elements and a set of aligned fibres of the fibre ribbon type.

To this end, the invention relates to a method for the collective production of microlenses at the end of a set of aligned optical fibres, principally characterised in that it comprises a step of heating the end of all the fibres by means of an electric arc in order to form the microlenses, the plane in which the ends of the fibres are situated being distant from the line of hottest points of the electric arc in order to round their end evenly.

The method according to the invention also has the advantage of being collective and therefore compatible with mass production, and with a very high performance.

According to another characteristic of the invention, the distance between the optical fibre ends and the line of hottest points is between 850 micrometres and 950 micrometres.

Advantageously, the set of optical fibres consists of a ribbon.

According to a preferred embodiment of the invention, the ribbon comprises monomode fibres whose terminations comprise a length of silica welded to a length of fibre with an index gradient, the microlenses being produced at the end of the lengths of fibres with an index gradient.

BRIEF DESCRIPTION OF THE DRAWINGS

Other advantages and particularities of the invention will emerge clearly from a reading of the description which is made below and which is given by way of non-limitative example with regard to the drawings, in which.

The method according to the invention consists in rounding the end of a set of fibres being in the majority of applications in the form of a ribbon of fibre 10, by means of an electric arc welder, only the electrodes of which are depicted at E1, E2, the ribbon 10 being placed far from the line X of the hottest point so that the ends of the fibres of the ribbon are aligned at a distance d of around one millimetre (typically 900 $\mu$m) with respect to this hot point, in order to be placed on an isotherm. This makes it possible, unlike the "lensing" at the hot point of the electrodes E1, E2, to obtain a hemispherical shape which is not only homogeneous over all the fibres of the ribbon, but also not to modify the diameter of the fibres.

DESCRIPTION OF THE PREFERRED EMBODIMENTS

According to a preferred embodiment, the method is applied to the production of hemispherical lenses with a microlens as described in the patent EP 0 825 464 of the applicant.

Figure 4:
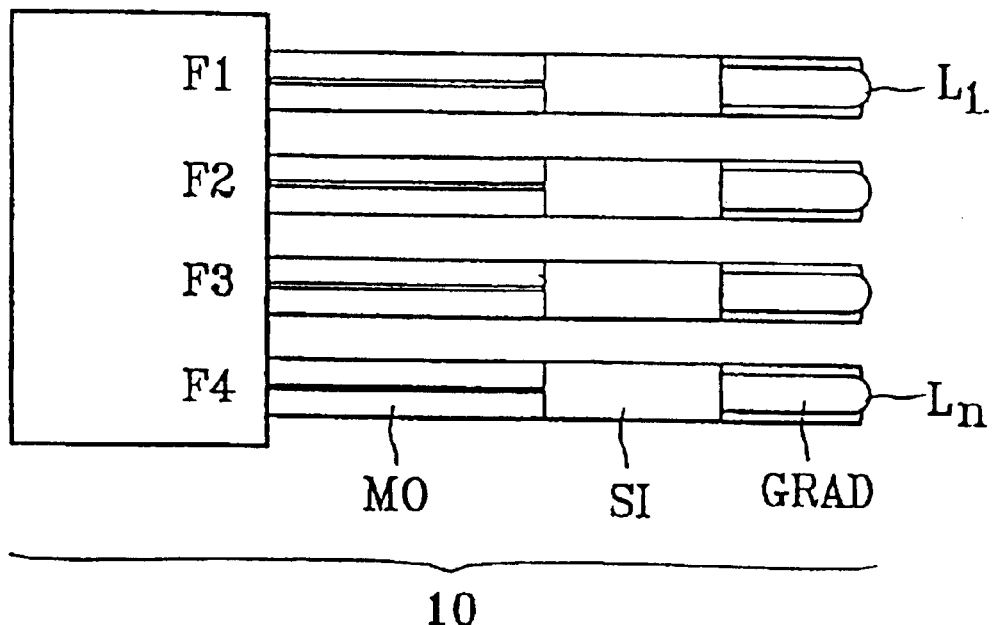
FIG. 4 depicts the diagram of a "lensed" ribbon of fibres according to the method in accordance with the invention.

The patent EP 0 825 464 relates to a collective microlens known as GRADISSIMO since it consists of lengths of multimode fibres with an index gradient GRAD and silica SI welded successively together and to a ribbon of monomode fibres MO, referenced 10 in FIG. 4.

The invention consists of collectively "lensing" the end of this microlens.

dB for 15 $\mu$m of working distance in front of a cleft monomode fibre.

For this example application, the method consists in first producing the microlens ribbon 10 known as "GRADISSIMO" by collective welding and cleaving of lengths of fibres with an index gradient and silica on a ribbon of monomode fibres as described in the patent EP 0 825 464.

Figure 1:
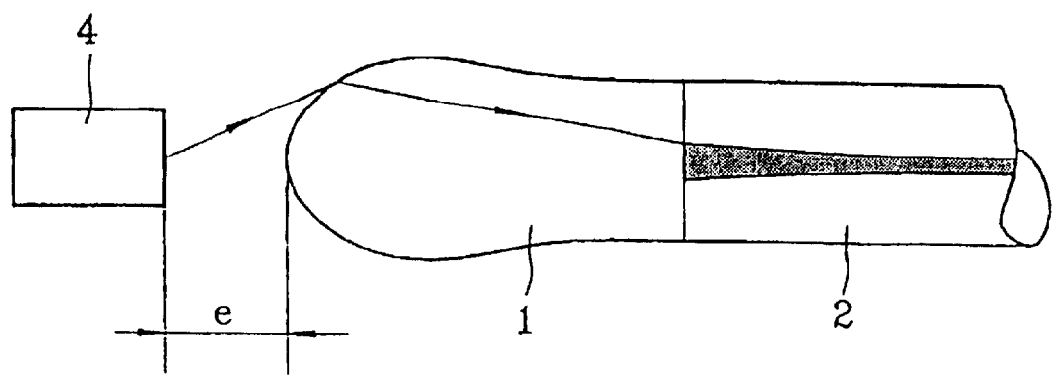
FIG. 1 depicts an individual coupling lens according to the state of the art.
Figure 2:
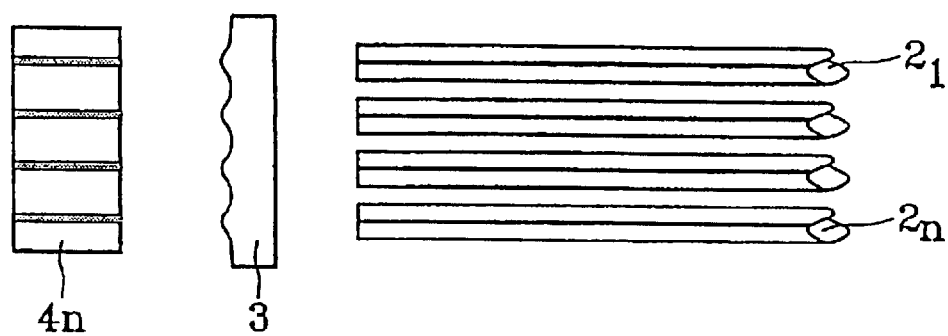
FIG. 2 depicts a collective coupling lens according to the state of the art.
Figure 3:
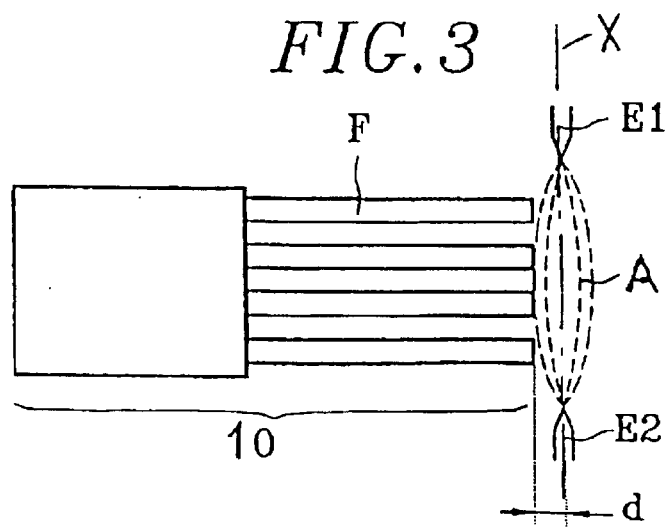
FIG. 3 depicts the outline diagram of the production method according to the invention.

This ribbon is then placed, in the same collective welder as the one used for producing the "GRADISSIMO" ribbon, typically at 900 $\mu$m from the normal welding position on the optical axis. This is possible through the control (optional) which makes it possible to control the motors and the arc of the welder by RS232 interface. An electric arc is then sent, and makes it possible to round the end of the lengths of fibres with an index gradient as illustrated in FIGS. 3 and 4.

The diameter of the hemisphere depends on the electric arc/fibre distance and the electrode discharge current.

By way of example the Sumitomo type T62welder was used.

Figure 5:
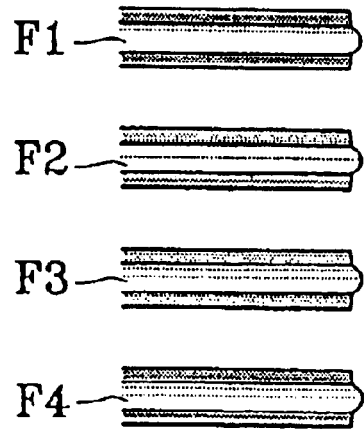
FIG. 5 illustrates a photograph of a "lensed" ribbon according to the invention.

Then there was obtained collectively a ribbon of microlenses which is hereinafter referred to as "SUPERGRADISSIMO", having a hemispherical end as illustrated in FIGS. 4 and 5 making it possible to improve the coupling level in front of arrays of active components such as lasers, semiconductor amplifiers or photodiodes for example.

The fibres being situated far from the hot point, only the core of the fibre with a gradient index is melted so that the outside diameter of 125 $\mu$m is maintained over the entire length of the microlens, including at its end.

Here are a few example embodiments from a ribbon with 4 channels F1, F2, F3, F4:

EXAMPLE 1

The coupling of a "supergradissimo" ribbon was effected in front of a BRS laser with a wavelength 1.301 $\mu$m of 60°×50° of total divergence in far field at $1/e^2$ of the maximum intensity.

The measuring conditions were as follows:

T°=21° C., polarisation current I=42 mA, reference power of the laser 10,000 $\mu$W.

The results are illustrated by the following table:

| Channel (1 fibre = one channel) | Welding losses silica/ index gradient (dB) | Length of silica ($\mu$m) | Welding losses (silica/ monomode) | Length of index gradient ($\mu$m) | Radius of hemisphere ($\mu$m) | Coupling losses (dB) | Working distance ($\mu$m) |
|---|---|---|---|---|---|---|---|
| F1 | 0.06 | 544.00 | 0.04 | 357.19 | 68 | 2.56 | 53.5 |
| F2 | 0.02 | 546.50 | 0.03 | 358.00 | 68 | 2.59 | 54.3 |
| F3 | 0.07 | 546.12 | 0.02 | 354.45 | 68 | 2.55 | 53.3 |
| F4 | 0.03 | 546.12 | 0.05 | 357.19 | 68 | 2.52 | 54.2 |

The losses are 2.5±0.05 dB in front of 60°×50° of total divergence in far field of $1/e^2$ of the maximum intensity for working distances of 100±5 $\mu$m, instead of 10.5 dB for 15 $\mu$m of working distance in front of a cleft monomode fibre.

The losses are 1.4±0.05 dB in front of lasers of 21°×21° of total divergence in far field at $1/e^2$ of the maximum intensity for working distances of 100±5 $\mu$m, instead of 3.2

EXAMPLE 2

The coupling of a "supergradissimo" ribbon was effected in front of a BRS laser 1.310 $\mu$m of 210×21° of total divergence in far field at $1/e^2$ of the maximum intensity.

The measuring conditions were as follows:

T°=22° C., polarisation current I=72.6 mA, reference power of the laser 10,000 $\mu$W.

The results are illustrated by the following table:

| Channel | Welding losses silica/ index gradient (dB) | Length of silica (μm) | Welding losses (silica/ monomode) | Length of index gradient (μm) | Radius of hemi- sphere (μm) | Reflect ivity at end of fibre (dB) | Coupling losses (dB) | Working distance (μm) |
|---|---|---|---|---|---|---|---|---|
| F1 | 0.05 | 275.00 | 0.05 | 279.00 | 82 | −39.3 | 1.45 | 102.40 |
| F2 | 0.04 | 275.00 | 0.02 | 281.00 | 80 | −40.1 | 1.41 | 107.60 |
| F3 | 0.03 | 274.50 | 0.06 | 281.00 | 83 | −41.9 | 1.38 | 107.80 |
| F4 | 0.04 | 274.00 | 0.02 | 282.00 | 81 | −39.3 | 1.42 | 105.00 |

By way of comparison, because of its rounded profile, the reflectivity measured at the end of the fibre by means of a reflectometer of the WIN-R type from Photondtics is typically −40 dB instead of −14.7 dB for a cleft fibre.

In addition, the great working distance limits the power reinjected into the laser diode after reflection on the fibre. This is very important for applications of the semiconductor amplifier type or lasers with external cavities for which the stray reflections interfere with the functioning.

A low-cost collective "lensing" method has just been described which makes it possible to improve the coupling between the arrays of active components and ribbons of monomode fibres compared with the prior art (up to 1.5 dB of losses) for large working distances (up to 100 μm). And this in a homogeneous manner over ribbons of fibres, it being understood of course that this is merely an example with 4 channels.

The applications of the invention in the field of telecommunications fit just as well in distribution networks for their collective and low cost aspect and in transmission networks because of their high coupling performances and their low reflectivity level. The large working distances which they offer are an advantage for all applications, and are in fact less critical to position and greatly reduce the influence of Fresnel reflections.

Reference can be made to the table annexed to the description which illustrates results obtained for the radius of the spheres as a function of the distance between the fibre ribbon and the hot point of the electrodes E1, E2, the current sent to the electrodes in arbitrary units and the electrode discharge time. The margin indicated for each radius corresponds to the scattering of the values on the ribbon.

| Sample N° | Distance ribbon/ electrodes (μm) | Current (μ.a) | Electrode discharge time | Radius of hemisphere (μm) |
|---|---|---|---|---|
| 298 | 920 | 60 | 7 | 82 ± 5 |
| 297 | 920 | 60 | 7 | 60 ± 5 |
| 302 | 920 | 60 | 6 | 95 ± 5 |
| 288 | 910 | 60 | 5 | 110 ± 5 |
| 293 | 910 | 60 | 7 | 80 ± 5 |
| 285 | 910 | 59 | 7 | 90 ± 5 |
| 277 | 910 | 60 | 4 (3 impacts) | 75 ± 5 |
| 287 | 910 | 58 | 5 (2 impacts) | 80 ± 5 |
| 295 (ex. 2) | 900 | 60 | 6 | 82 ± 5 |
| 294 | 900 | 60 | 6 | 90 ± 5 |
| 290 | 900 | 60 | 7 | 85 ± 5 |
| 292 | 900 | 60 | 8 | 90 ± 5 |
| 291 | 900 | 59 | 9 | 85 ± 5 |
| 296 | 900 | 60 | 6 (2 impacts) | 78 ± 5 |
| 287 | 890 | 56 | 5 | 110 ± 20 |
| Test | 890 | 55 | 3 | 100 ± 30 |
| Test | 850 | 63 | 5 | 75 ± 5 |
| 286 (ex. 1) | 840 | 63 | 5 | 68 ± 0 |
| Test | 830 | 63 | 5 | 70 ± 5 |
| Test | 730 | 63 | 5 | Not homogeneous |
| Test | 400 | 50 | 2 | Not homogeneous |
| Test | 350 | 45 | 3 | No rounded part |
| Test | 300 | 50 | 2 | Not homogeneous |
| Test | 200 | 50 | 2 | Not homogeneous |
| Test | 200 | 30 | 2 | No rounded part |
| Test | 20 | 50 | 2 | Large lenses not homogeneous |

Beams are obtained with a hemispherical end of between 68 and 110 μm with a homogeneity of ±5 μm on the 4 channels of the ribbon for distances between hot point and ribbon ranging from 830 to 920 μm. Ribbons 286 and 295 are the subject of embodiments presented respectively in Examples 1 and 2.

What is claimed is:

1. A method for the collective production of microlenses at the end of a set of aligned optical fibres, characterised in that it comprises a step of heating the end face of the end of all the fibres by means of an electric arc, the end face of the ends of the fibres terminating short of a line of the hottest points of the electric arc and at a distance from this line in order to round all the fibre ends homogeneously and simultaneously to obtain all the microlenses.

2. A method for the collective production of microlenses according to claim 1, characterised in that the distance between the front face of the ends of the optical fibres and the line of the hottest points is between 850 micrometres and 950 micrometres.

3. A method for the collective production of microlenses according to claim 1, characterised in that the set of optical fibres consists of a ribbon.

4. A method for the collective production of microlenses according to claim 3, characterised in that the ribbon comprises monomode fibres whose terminations comprise a length of silica welded to a length of fibre with an index gradient, the microlenses being produce at the end of the lengths of fibres with an index gradient.

* * * * *